(12) United States Patent
Altman, III

(10) Patent No.: US 11,736,136 B1
(45) Date of Patent: Aug. 22, 2023

(54) PROTECTIVE SLEEVE AND PROTECTIVE SLEEVE SYSTEM

(71) Applicant: Larry T. Altman, III, Virginia Beach, VA (US)

(72) Inventor: Larry T. Altman, III, Virginia Beach, VA (US)

( * ) Notice: Subject to any disclaimer, the term of this patent is extended or adjusted under 35 U.S.C. 154(b) by 201 days.

(21) Appl. No.: 16/903,059

(22) Filed: Jun. 16, 2020

Related U.S. Application Data

(60) Provisional application No. 62/862,736, filed on Jun. 18, 2019.

(51) Int. Cl.
| | |
|---|---|
| *H04B 1/3888* | (2015.01) |
| *C08L 23/12* | (2006.01) |
| *H04M 1/02* | (2006.01) |
| *C08L 67/02* | (2006.01) |

(52) U.S. Cl.
CPC ............ *H04B 1/3888* (2013.01); *C08L 23/12* (2013.01); *C08L 67/02* (2013.01); *H04M 1/0202* (2013.01); *C08L 2203/206* (2013.01)

(58) Field of Classification Search
CPC ....... H04B 1/3888; C08L 23/12; C08L 67/02; C08L 2203/206; H04M 1/0202
See application file for complete search history.

(56) References Cited

U.S. PATENT DOCUMENTS

| | | | |
|---|---|---|---|
| 6,182,878 B1* | 2/2001 | Racca ................. | H04B 1/3888 224/604 |
| 2006/0058073 A1* | 3/2006 | Kim ..................... | H04B 1/3877 455/573 |
| 2014/0270584 A1* | 9/2014 | Exner ..................... | B31B 50/26 493/243 |
| 2015/0133204 A1* | 5/2015 | Ivanovski ............ | H04B 1/3888 455/575.8 |
| 2015/0341072 A1* | 11/2015 | Lai ....................... | H04B 1/3888 455/575.8 |
| 2018/0191107 A1* | 7/2018 | Huang ................ | H01R 13/6581 |
| 2020/0046589 A1* | 2/2020 | Simmons ............... | B65D 33/04 |

* cited by examiner

*Primary Examiner* — Yuwen Pan
*Assistant Examiner* — Fatuma G Sherif
(74) *Attorney, Agent, or Firm* — Shaddock Law Group, PC

(57) ABSTRACT

A protective sleeve having a protective sleeve body formed of a front wall portion and a rear wall portion, wherein an internal sleeve cavity is formed within at least a portion of the protective sleeve body, wherein the sleeve cavity is defined between an open top portion and a bottom wall portion of the sleeve body; a top flap extending from a portion of the front wall portion, wherein the top flap is foldable over the open top portion to fully cover the open top portion; a port formed through the protective sleeve, proximate the bottom wall portion, wherein the port allows access from an exterior of the protective sleeve to the sleeve cavity; and a port tab extending from the front wall portion, wherein the port tab is foldable over the port to at least partially cover the port.

20 Claims, 14 Drawing Sheets

PROTECTIVE SLEEVE AND PROTECTIVE SLEEVE SYSTEM

CROSS-REFERENCE TO RELATED APPLICATIONS

This patent application claims the benefit of U.S. Patent Application No. 62/862,736, filed Jun. 18, 2019, the disclosure of which is incorporated herein in its entirety by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of protective sleeves or covers. More specifically, the present disclosure relates to protective sleeves or covers for mobile electronic devices.

2. DESCRIPTION OF RELATED ART

In certain environments or situations, it is desirable to provide a cover or sleeve for a mobile electronic device in order to maintain a sterile environment or prevent cross-contamination.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

Unfortunately, known protective sleeves or covers do not provide a sufficient safety barrier for enclosed mobile electronic device to allow the mobile electronic device to be utilized in a sterile or aseptic environment.

In various exemplary, nonlimiting embodiments, the protective sleeves of the present disclosure are formed of a 1.2-1.5 mil thick Polypropylene or Polyethylene terephthalate (PET) material. The construction allows the protective sleeves to be thin enough to retain all touch controls, while wearing latex or nitrile gloves, all while being thick enough to create a safe barrier between the enclosed mobile electronic device and the work environment. The Polypropylene or PET material also holds up to heat generated by any enclosed or encased mobile electronic device without becoming weak or allowing contaminants to penetrate the protective sleeve. While 1.2-1.5 mil thickness is most frequently used, it is not limited to only that thickness. Thickness may vary depending on the types of gloves used. PET materials are used in cases where a clearer visibility is desired by the user.

The protective sleeves are sealed on the rear wall portion with a flap that has an adhesive strip.

In various exemplary embodiments, the protective sleeve includes a separate adhesive strip formed down one or more additional sides for the use of adjusting the size to fit tightly on smaller devices.

In various exemplary embodiments, the protective sleeve has the option for a small cut or port formed in the bottom wall portion of the protective sleeve for ease of to the sleeve cavity for attaching a connector cable for charging or data exchange. This small cut or port may optionally be covered or at least partially covered by a port tab. The port tab can then be permanently or releasably attached or coupled to an outer surface of the protective sleeve, via a port tab adhesive that serves to both seal the port opening when not used and allow access to the port for connection of the connector cable to a mobile electronic device positioned within a sleeve cavity of the protective sleeve.

In certain exemplary embodiments, the protective sleeve may also include an interlocking system for the connector cable to pass through and remain uncontaminated while being used. The interlocking system is optionally integrated into a portion of the protective sleeve for strength and safety. The interlocking system provides a unique feature to the protective sleeve in that the protective sleeve allows a mobile electronic device positioned within the sleeve cavity to be attached or coupled to the connector cable during use without the fear of cross-contamination. Both protective sleeves and integrated cable extension protector (interlocking system) may vary in sizes to fit various applications to ensure safety and cleanliness. While most frequently the interlocking system will be a threaded locking system of various number of threads, it is not limited to this only, it may also include options of a slot lock, a ribbed click in lock, or other variations.

In various exemplary, nonlimiting embodiments, the present disclosure comprises a protective sleeve system comprising a protective sleeve body having at least one pair of opposed wall portions comprising a front wall portion and a rear wall portion, wherein an internal sleeve cavity is formed within at least a portion of the protective sleeve body, wherein the sleeve cavity is defined between an open top portion of the sleeve body and a bottom wall portion of the sleeve body; a top flap extending from a portion of the front wall portion, beyond at least a portion of the rear wall portion, wherein the top flap is formed so as to be able to be folded over the open top portion to fully cover the open top portion; a port formed through the protective sleeve, proximate the bottom wall portion, wherein the port allows access from an exterior of the protective sleeve, through the protective sleeve, to the sleeve cavity; a port tab extending from the front wall portion, wherein the port tab is foldable over the port to at least partially cover the port; and a cable protector comprising a tubular or flat tubular portion of material having an internal cavity formed along a length of the cable protector.

In various exemplary, nonlimiting embodiments, the protective sleeve system further includes a pair of opposed wall portions comprising a first side wall portion and a second side wall portion, wherein the first side wall portion and the second side wall portion join the front wall portion and the rear wall portion.

In various exemplary, nonlimiting embodiments, the protective sleeve system further includes at least a portion of the front wall portion is heat welded or adhesively bonded to at least a portion of the rear wall portion, proximate edge portions of the front wall portion and the rear wall portion, to define the sleeve cavity.

In various exemplary, nonlimiting embodiments, the protective sleeve is formed of Polyethylene terephthalate.

In various exemplary, nonlimiting embodiments, the wall portions of the protective sleeve are approximately 1.2-1.5 mil thick.

In various exemplary, nonlimiting embodiments, the protective sleeve system further includes an adhesive strip provided along a portion of the top flap.

In various exemplary, nonlimiting embodiments, the protective sleeve system further includes a separate adhesive strip formed down one or more sides of the protective sleeve, wherein the separate adhesive strip is formed along a portion of the rear wall portion of the protective sleeve.

In various exemplary, nonlimiting embodiments, the protective sleeve system further includes an interlocking system including at least some of an interface portion extending from the sleeve cavity, through the port, to the exterior of the protective sleeve and a connector portion attached or coupled to an open end of the cable protector.

In various exemplary, nonlimiting embodiments, the present disclosure comprises a protective sleeve having at least some of a protective sleeve body having at least one pair of opposed wall portions comprising a front wall portion and a rear wall portion, wherein an internal sleeve cavity is formed within at least a portion of the protective sleeve body, wherein the sleeve cavity is defined between an open top portion of the sleeve body and a bottom wall portion of the sleeve body; a top flap extending from a portion of the front wall portion, beyond at least a portion of the rear wall portion, wherein the top flap is foldable over the open top portion to fully cover the open top portion; a port formed through the protective sleeve, proximate the bottom wall portion, wherein the port allows access from an exterior of the protective sleeve, through the protective sleeve, to the sleeve cavity; and a port tab extending from the front wall portion, wherein the port tab is foldable over the port to at least partially cover the port.

In various exemplary, nonlimiting embodiments, the present disclosure comprises a protective sleeve having at least some of a protective sleeve body having an internal sleeve cavity formed within at least a portion of said protective sleeve body, wherein said sleeve cavity is defined between an open top portion of said sleeve body and a bottom wall portion of said sleeve body; a top flap extending from a portion of a front wall portion of said protective sleeve body, wherein said top flap is foldable over said open top portion to at least partially cover said open top portion; a port formed through said protective sleeve, proximate said bottom wall portion, wherein said port allows access from an exterior of said protective sleeve, through said protective sleeve, to said sleeve cavity; and a port tab extending from said protective sleeve body, wherein said port tab is foldable over said port to at least partially cover said port.

Accordingly, the present disclosure provides a protective sleeve that provides a sufficient safety barrier for enclosed mobile electronic device to allow the mobile electronic device to be utilized in a sterile environment.

The present disclosure separately and optionally provides a protective sleeve that retains the touch control features of a mobile electronic device positioned within the protective sleeve, while wearing latex or nitrile gloves.

The present disclosure separately and optionally provides a protective sleeve that creates a barrier between an enclosed mobile electronic device and a work environment.

The present disclosure separately and optionally provides a protective sleeve that can be used as a single use or disposable protective sleeve.

These and other aspects, features, and advantages of the present disclosure are described in or are apparent from the following detailed description of the exemplary, non-limiting embodiments of the present disclosure and the accompanying figures. Other aspects and features of embodiments of the present disclosure will become apparent to those of ordinary skill in the art upon reviewing the following description of specific, exemplary embodiments of the present disclosure in concert with the figures.

While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

While any of the features described herein are possible, it may be the case that only some or even none of them are made use of in connection with the present disclosure. Furthermore, those with skill in the art may appreciate other advantages not expressly mentioned herein.

Any benefits, advantages, or solutions to problems that are described herein with regard to specific embodiments are not intended to be construed as a critical, required, or essential feature(s) or element(s) of the present disclosure or the claims.

BRIEF DESCRIPTION OF THE SEVERAL VIEWS OF THE DRAWINGS

As required, detailed exemplary embodiments of the present disclosure are disclosed herein; however, it is to be understood that the disclosed embodiments are merely exemplary of the present disclosure that may be embodied in various and alternative forms, within the scope of the present disclosure. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present disclosure.

The exemplary embodiments of the present disclosure will be described in detail, with reference to the following figures, wherein like reference numerals refer to like parts throughout the several views, and wherein.

DETAILED DESCRIPTION OF THE PRESENT DISCLOSURE

Figure 1:
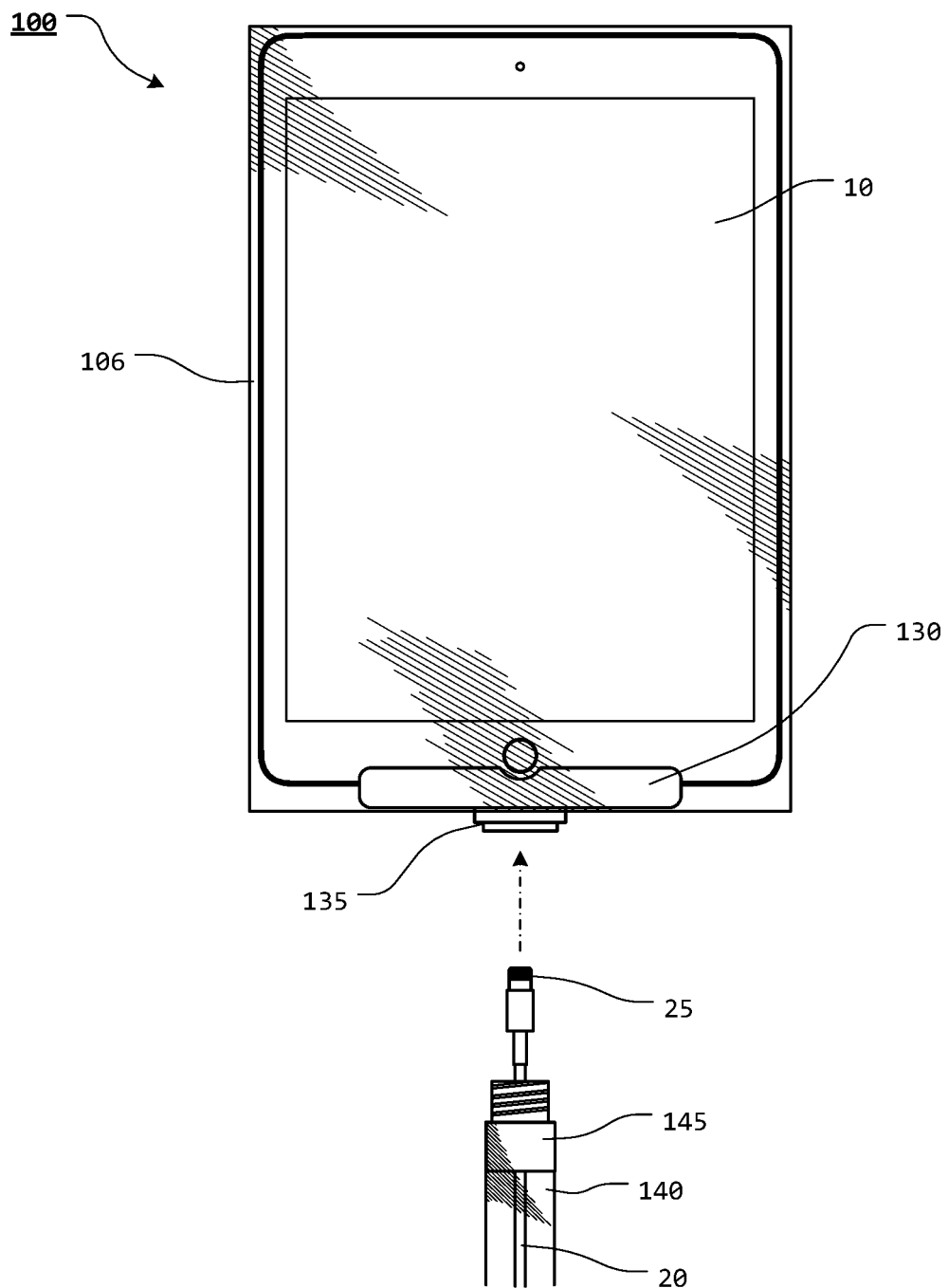
FIG. 1 illustrates a front view of certain exemplary components of a protective sleeve and interface portion, according to the present disclosure.

For simplicity and clarification, the design factors and operating principles of the protective sleeve and/or the cable protector according to the present disclosure are explained with reference to various exemplary embodiments of a protective sleeve and/or cable protector according to the present disclosure. The basic explanation of the design factors and operating principles of the protective sleeve and/or the cable protector is applicable for the understanding, design, and operation of the present disclosure. It should be appreciated that the present disclosure can be adapted to many applications where protective sleeves and/or cable protectors can be used.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the elements such terms describe. Thus, these terms are not necessarily intended to indicate temporal or other prioritization of such elements.

The term "coupled", as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that the terms "protective sleeve", "cable protector", and "interlocking system" are used for basic explanation and understanding of the operation of the systems, methods, and apparatuses of the present disclosure. Therefore, the terms "protective sleeve", "cable protector", and "interlocking system" are not to be construed as limiting the systems, methods, and apparatuses of the present disclosure. Thus, for example, the term "protective sleeve" is to be understood to broadly include any portion of material having a cavity and being capable of enclosing or encasing an object.

For simplicity and clarification, the protective sleeve and/or the cable protector of the present disclosure will be described as being used in conjunction with a mobile electronic device. However, it should be appreciated that these are merely exemplary embodiments of the protective sleeve and/or the cable protector and are not to be construed as limiting the present disclosure. The term "mobile electronic device" is to be understood to broadly include any portable personal computer or similar device with a mobile operating system, such as, for example, mobile phone, smartphone, cellular phone, tablet, portable media player, multi-purpose pocket computer, iPad, Google Tablet, Android platform, laptop computer, point of view camera, still or video camera, and the like.

Figure 2:
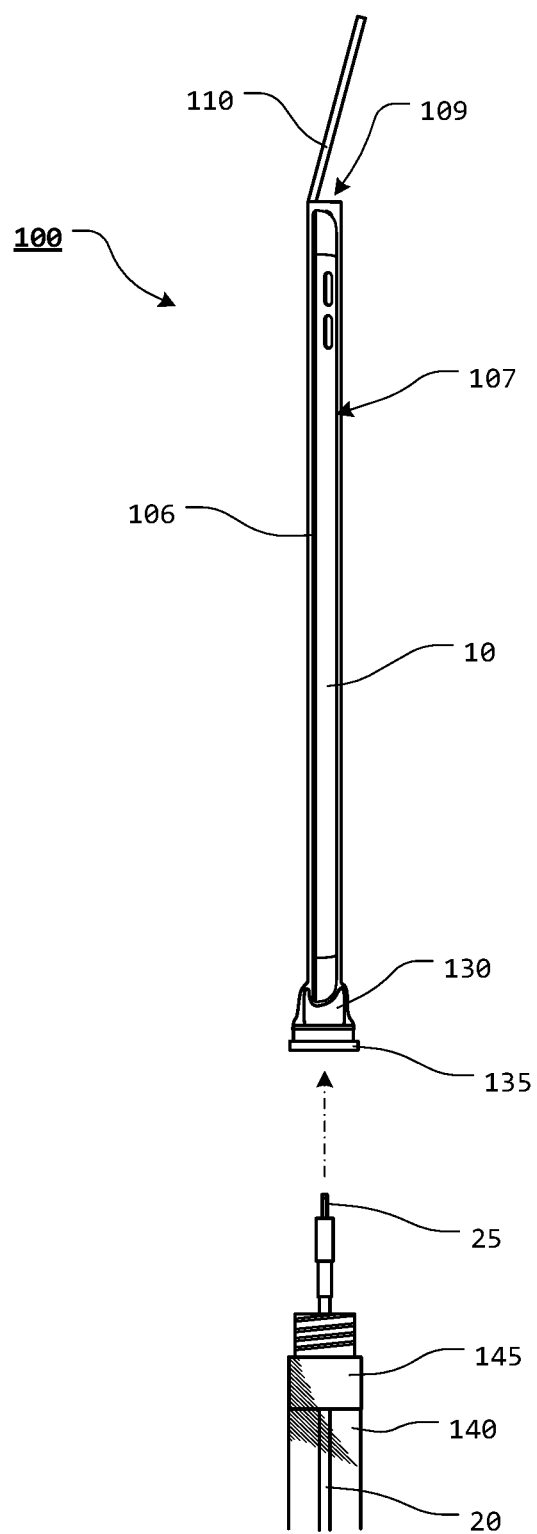
FIG. 2 illustrates a side, cross-sectional view of certain exemplary components of a protective sleeve and interface portion, according to the present disclosure.
Figure 3:
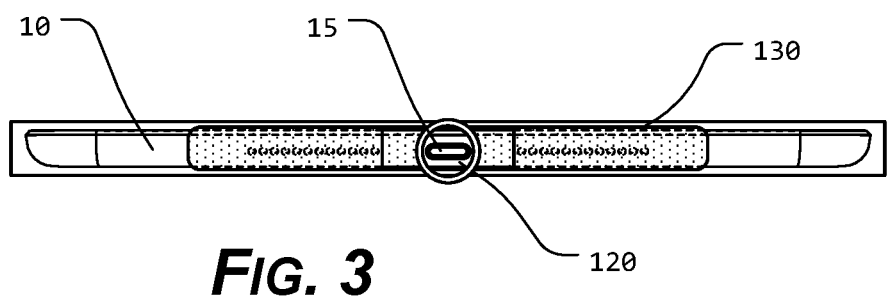
FIG. 3 illustrates a bottom view of certain exemplary components of a protective sleeve and interface portion, according to the present disclosure.
Figure 4:
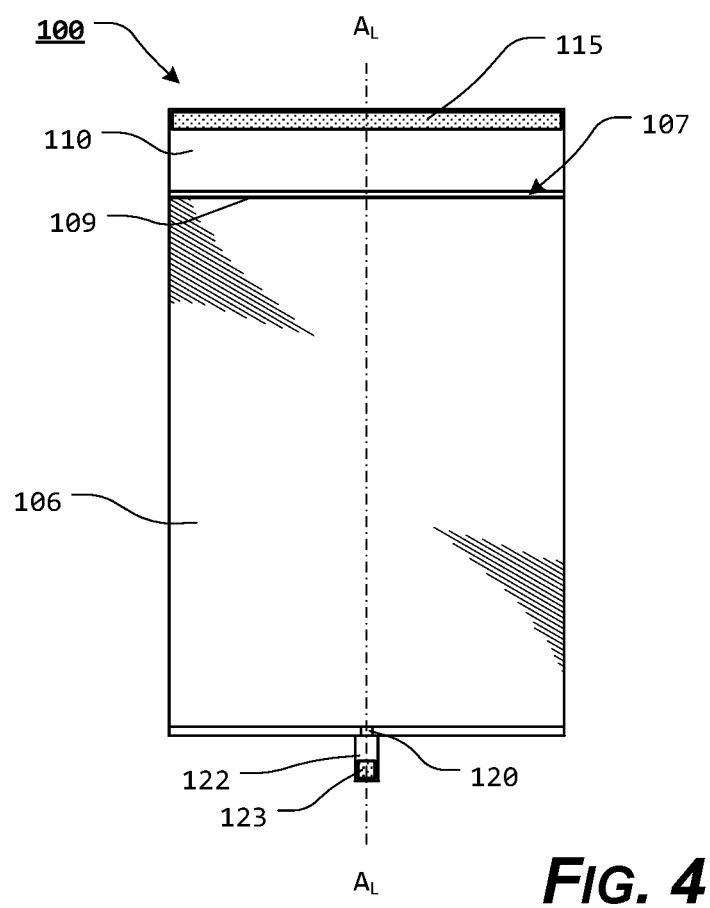
FIG. 4 illustrates a rear view of an exemplary protective sleeve, according to the present disclosure.
Figure 5:
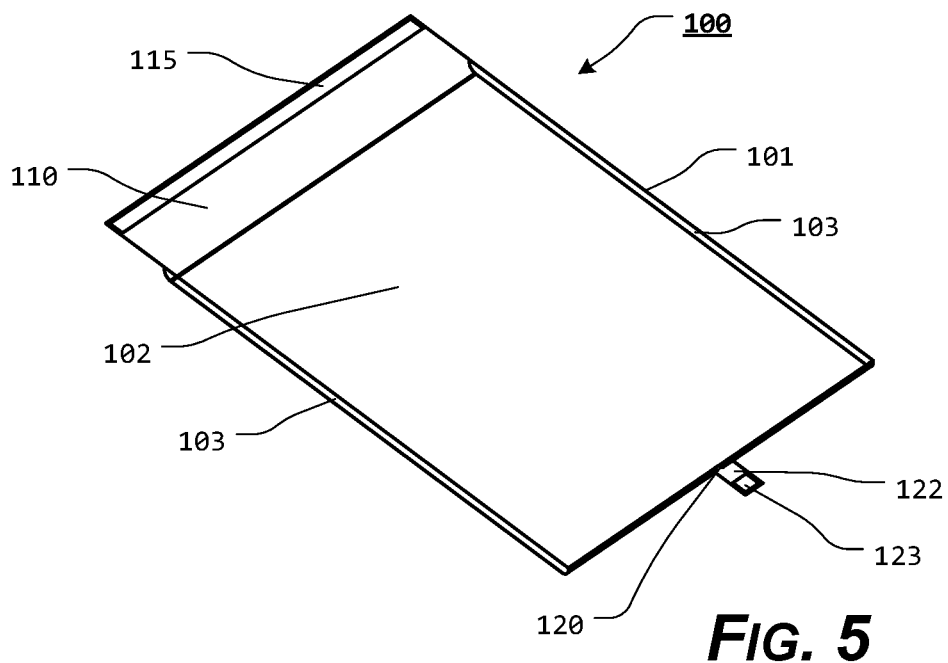
FIG. 5 illustrates a rear perspective view of an exemplary protective sleeve, according to the present disclosure.
Figure 6:
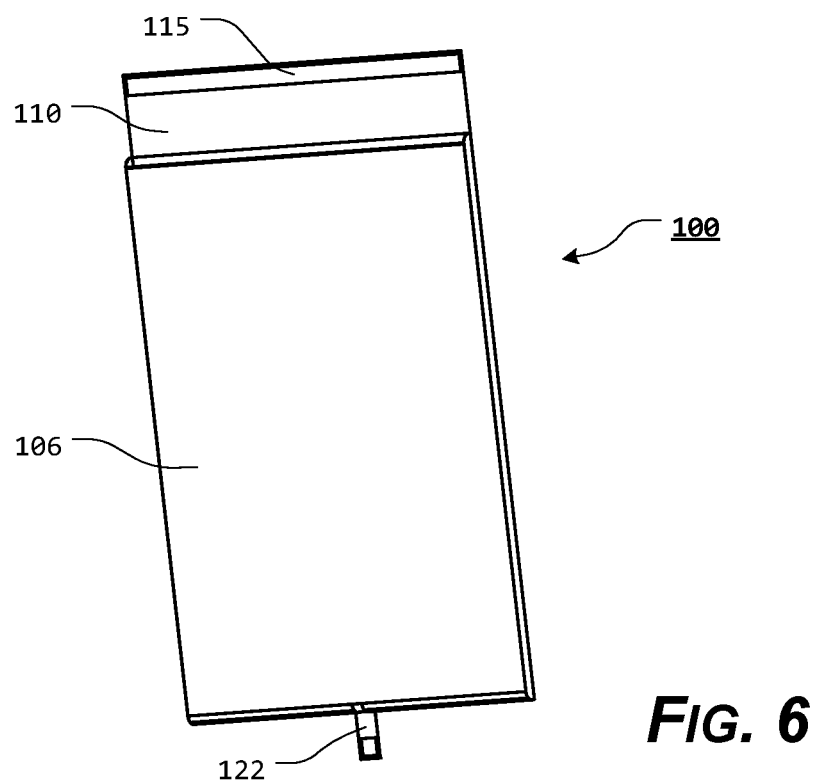
FIG. 6 illustrates an upper, rear perspective view of an exemplary protective sleeve, according to the present disclosure.
Figure 7:
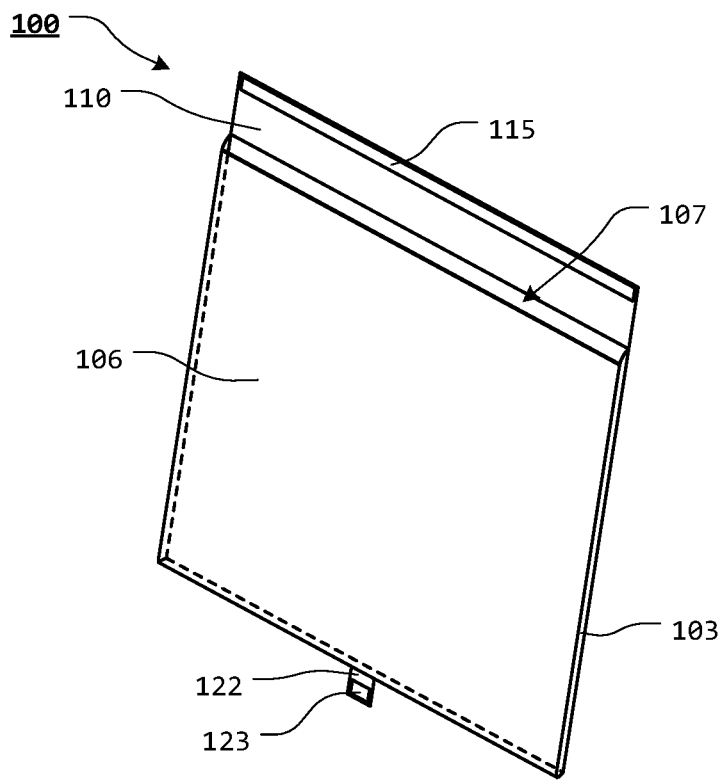
FIG. 7 illustrates an alternative upper, rear perspective view of an exemplary protective sleeve, according to the present disclosure.
Figure 8:
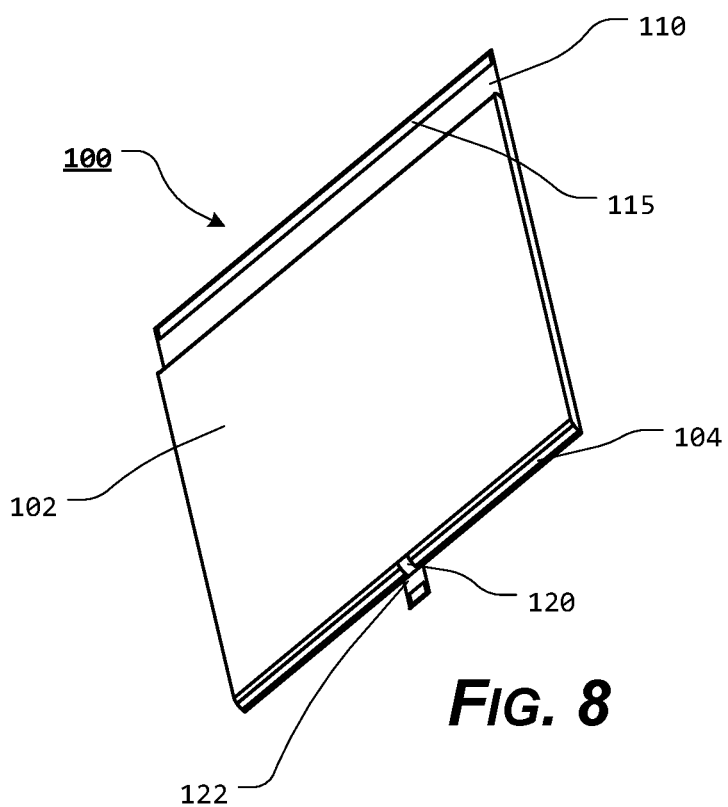
FIG. 8 illustrates a lower, rear perspective view of an exemplary protective sleeve, according to the present disclosure.
Figure 9:
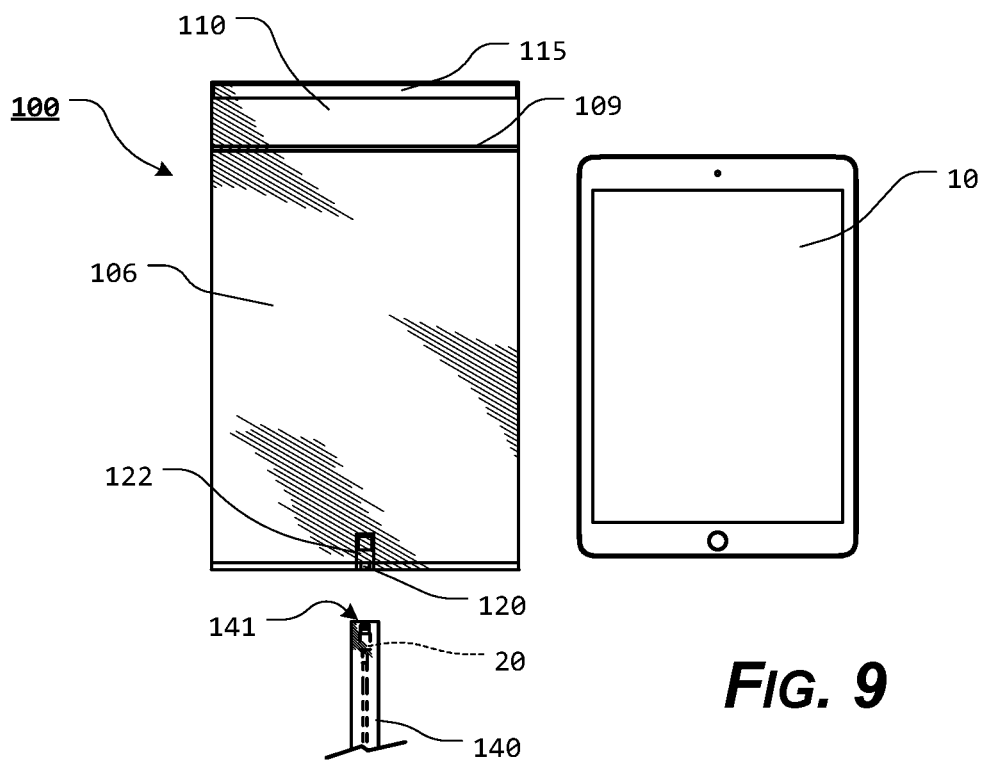
FIG. 9 illustrates a front view of an exemplary protective sleeve, an exemplary mobile electronic device, an exemplary connector cable, and an exemplary cable protector, according to the present disclosure.
Figure 10:
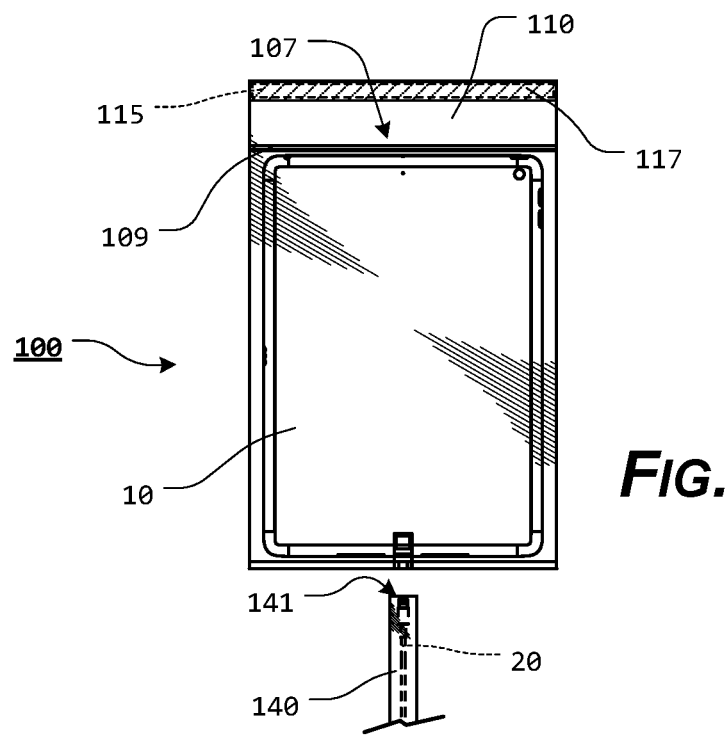
FIG. 10 illustrates a front view of an exemplary protective sleeve, an exemplary connector cable, and an exemplary cable protector, wherein an exemplary mobile electronic device is positioned within the protective sleeve according to the present disclosure.
Figure 11:
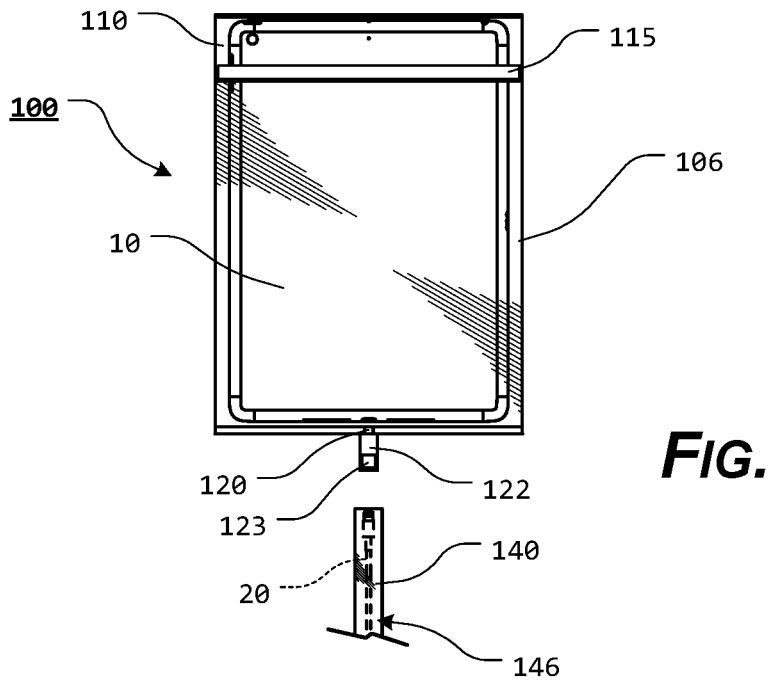
FIG. 11 illustrates a rear view of an exemplary protective sleeve, an exemplary connector cable, and an exemplary cable protector, wherein an exemplary mobile electronic device is positioned within the protective sleeve according to the present disclosure.
Figure 12:
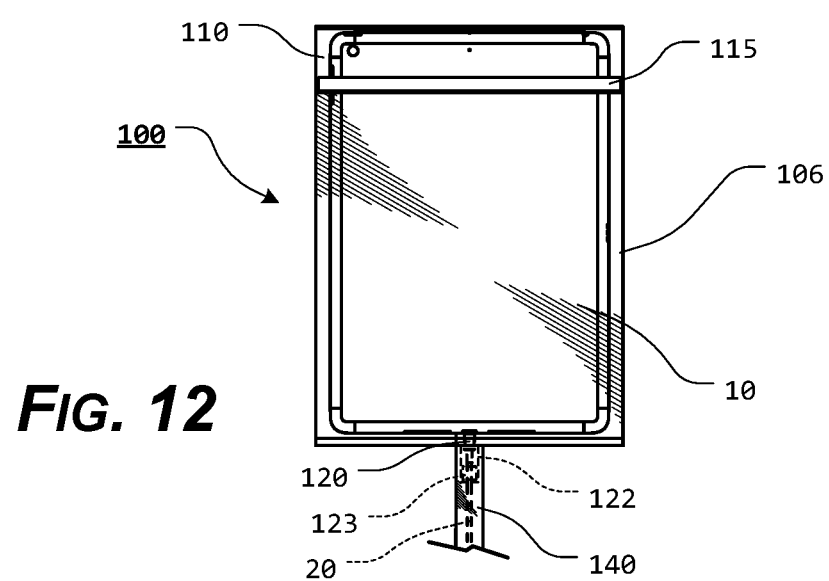
FIG. 12 illustrates a rear view of an exemplary protective sleeve, wherein an exemplary mobile electronic device is positioned within the protective sleeve, according to the present disclosure.
Figure 13:
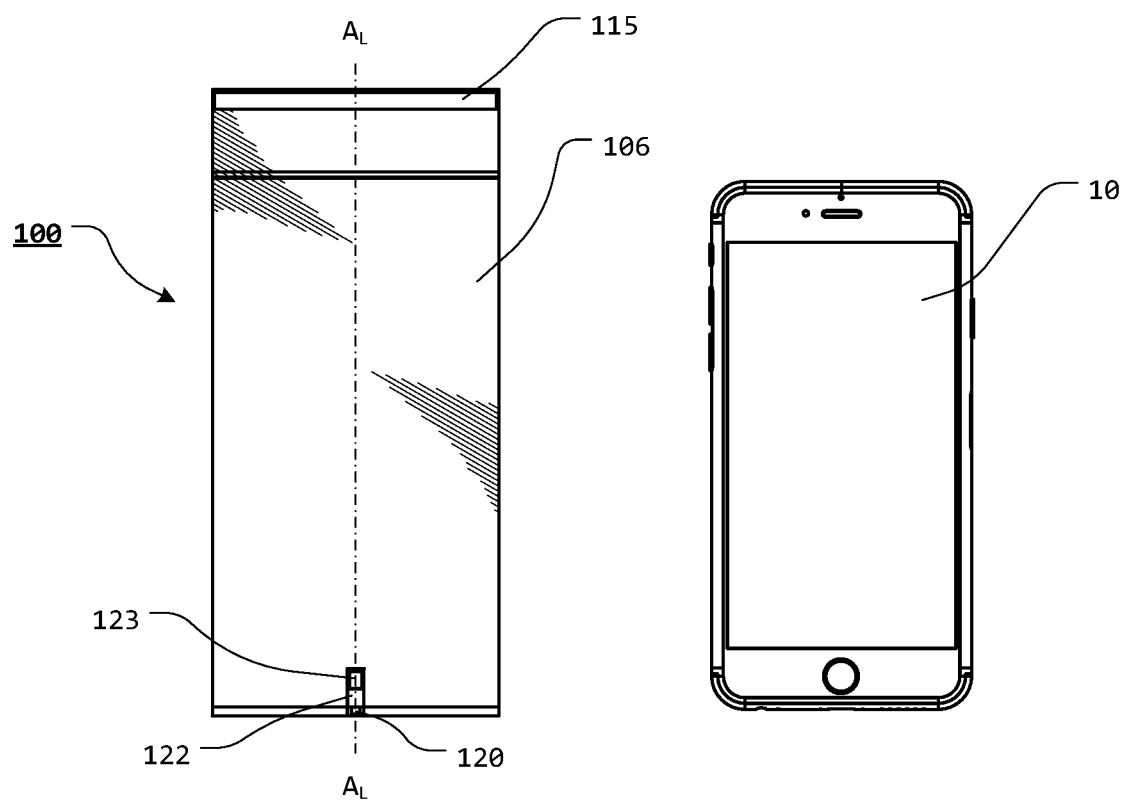
FIG. 13 illustrates a front view of an exemplary protective sleeve, an exemplary mobile electronic device, an exemplary connector cable, and an exemplary cable protector, according to the present disclosure.
Figure 14:
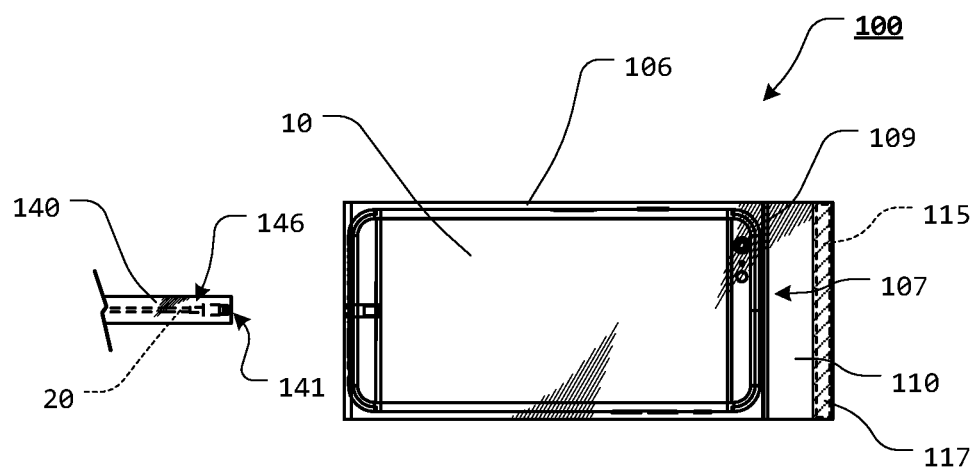
FIG. 14 illustrates a front view of an exemplary protective sleeve, an exemplary connector cable, and an exemplary cable protector, wherein an exemplary mobile electronic device is positioned within the protective sleeve according to the present disclosure.
Figure 15:
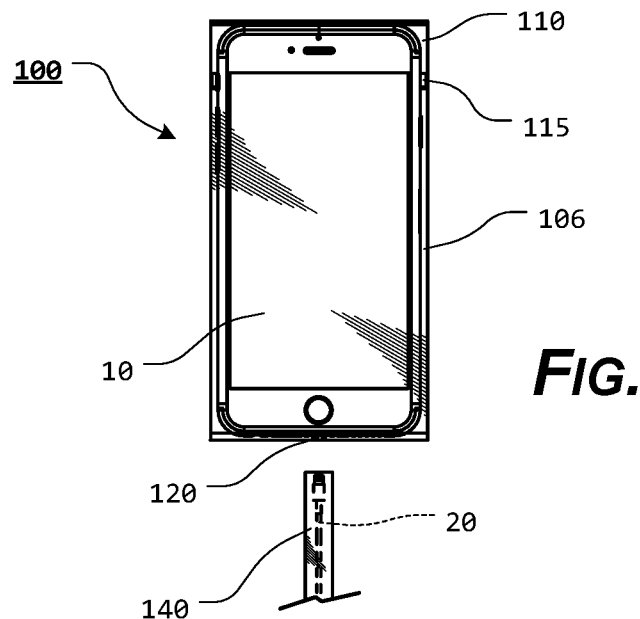
FIG. 15 illustrates a front view of an exemplary protective sleeve, an exemplary connector cable, and an exemplary cable protector, wherein an exemplary mobile electronic device is positioned within the protective sleeve according to the present disclosure.
Figure 16:
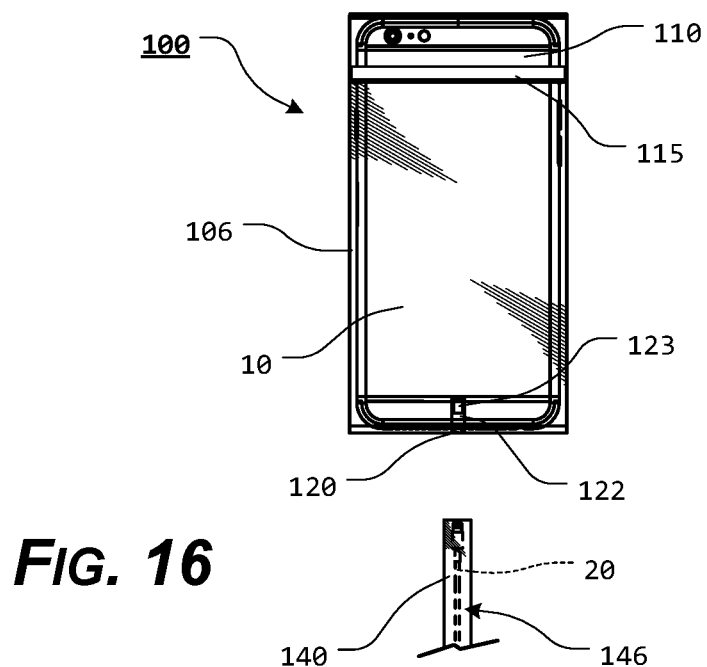
FIG. 16 illustrates a rear view of an exemplary protective sleeve, an exemplary connector cable, and an exemplary cable protector, wherein an exemplary mobile electronic device is positioned within the protective sleeve according to the present disclosure.
Figure 17:
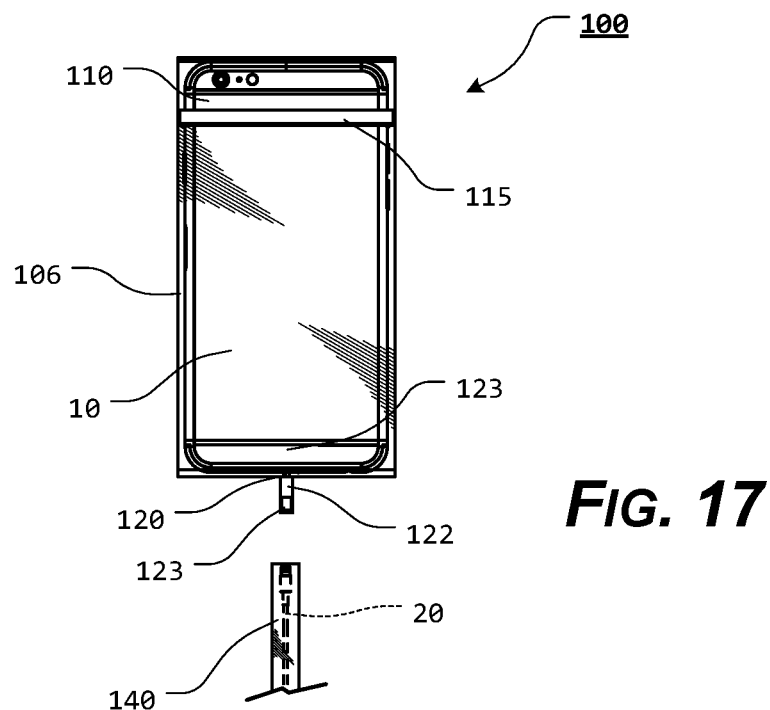
FIG. 17 illustrates a rear view of an exemplary protective sleeve, wherein an exemplary mobile electronic device is positioned within the protective sleeve, according to the present disclosure.
Figure 18:
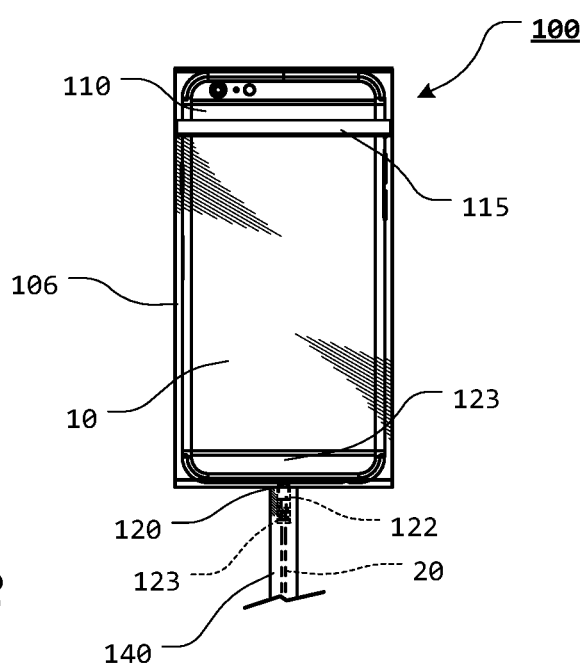
FIG. 18 illustrates a rear view of an exemplary protective sleeve, wherein an exemplary mobile electronic device is positioned within the protective sleeve, according to the present disclosure.
Figure 19:
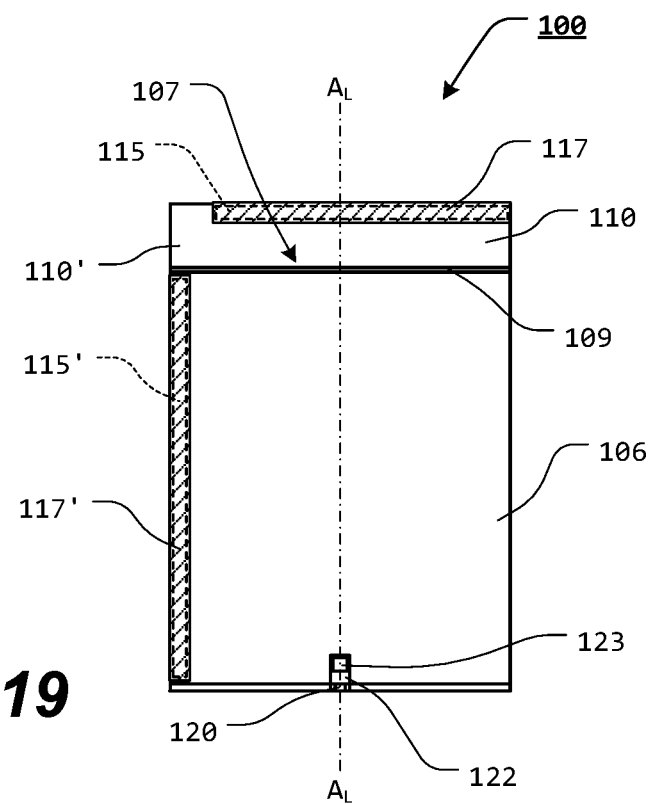
FIG. 19 illustrates a rear view of an exemplary protective sleeve, according to the present disclosure.
Figure 20:
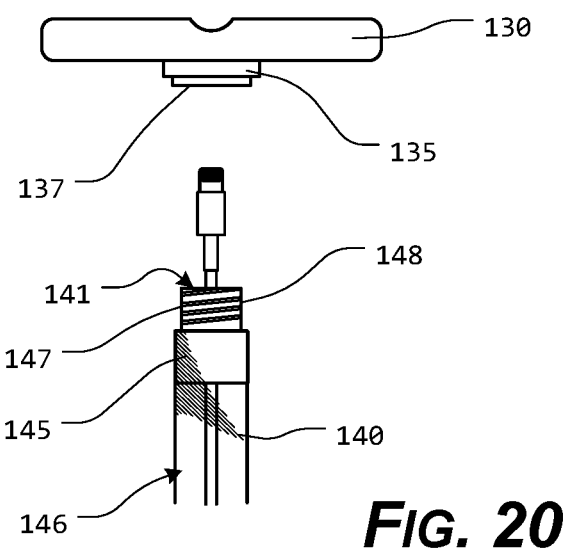
FIG. 20 illustrates a front, partial view of an exemplary interface portion, according to the present disclosure.
Figure 21:
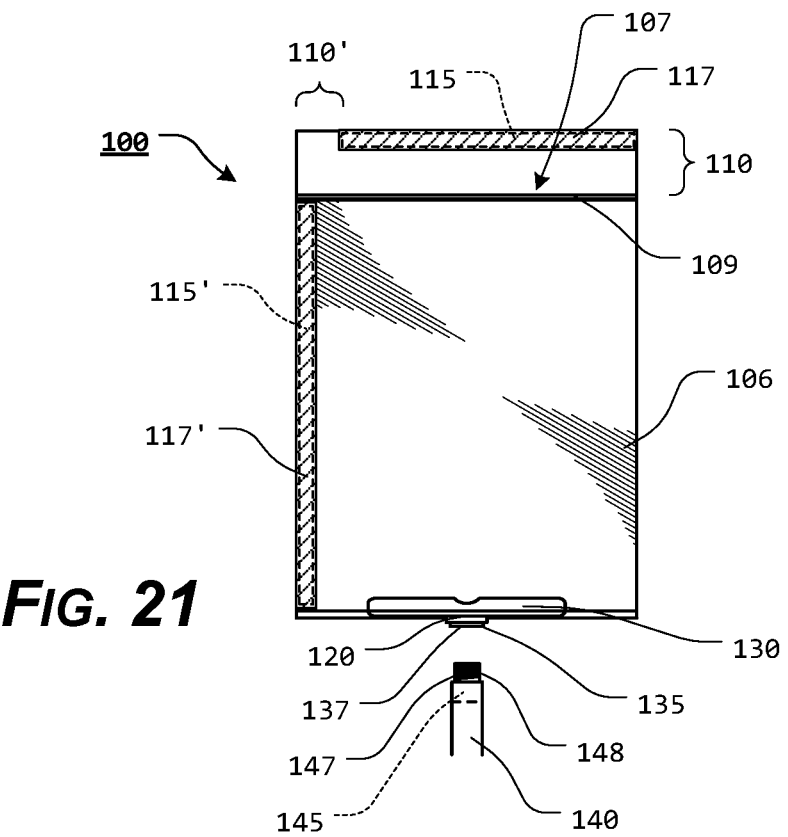
FIG. 21 illustrates a front view of an exemplary protective sleeve, an interface portion, a connector portion, and an exemplary cable protector, according to the present disclosure.
Figure 22:
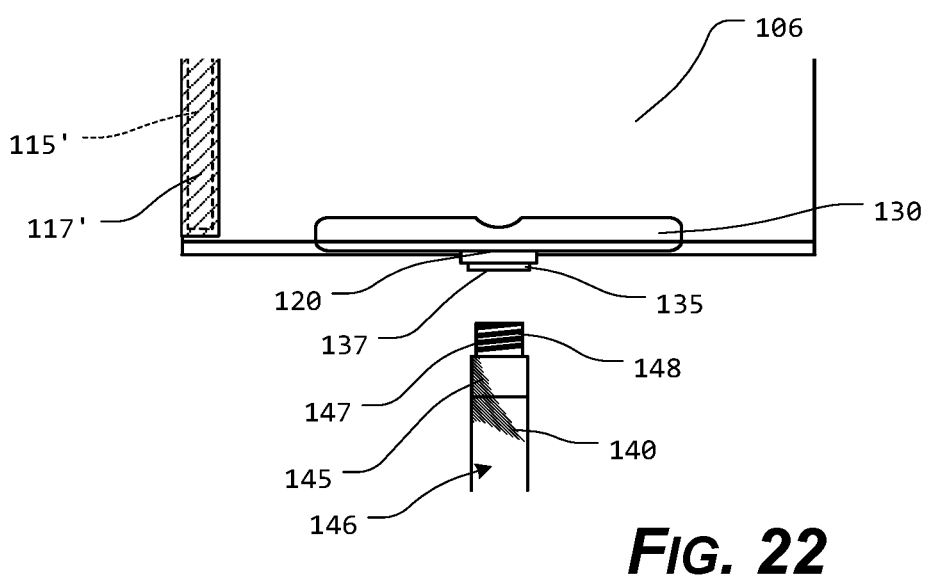
FIG. 22 illustrates a more detailed, partial front view of an exemplary protective sleeve and an exemplary interface portion, according to the present disclosure.
Figure 23:
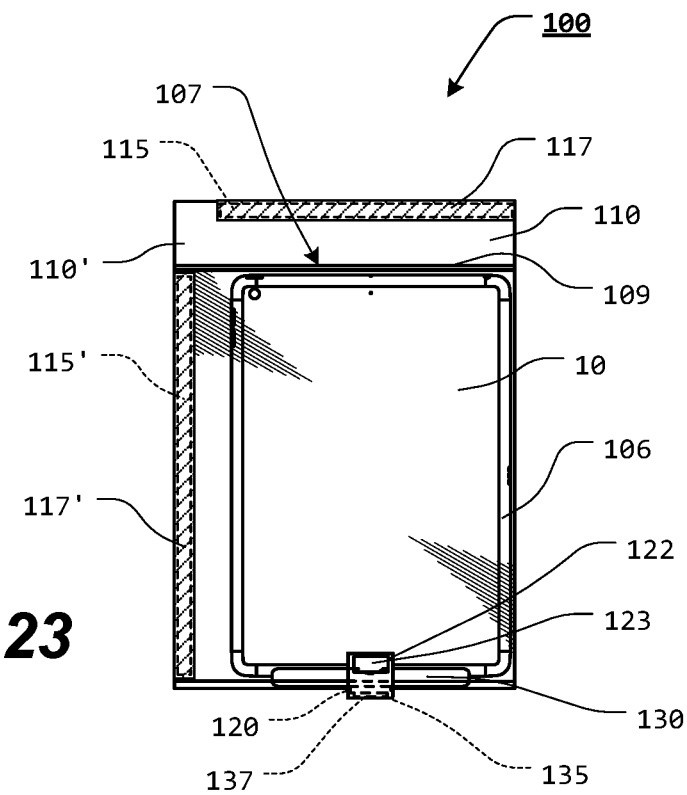
FIG. 23 illustrates a rear view of an exemplary protective sleeve, wherein an exemplary mobile electronic device is positioned within the protective sleeve according to the present disclosure.
Figure 24:
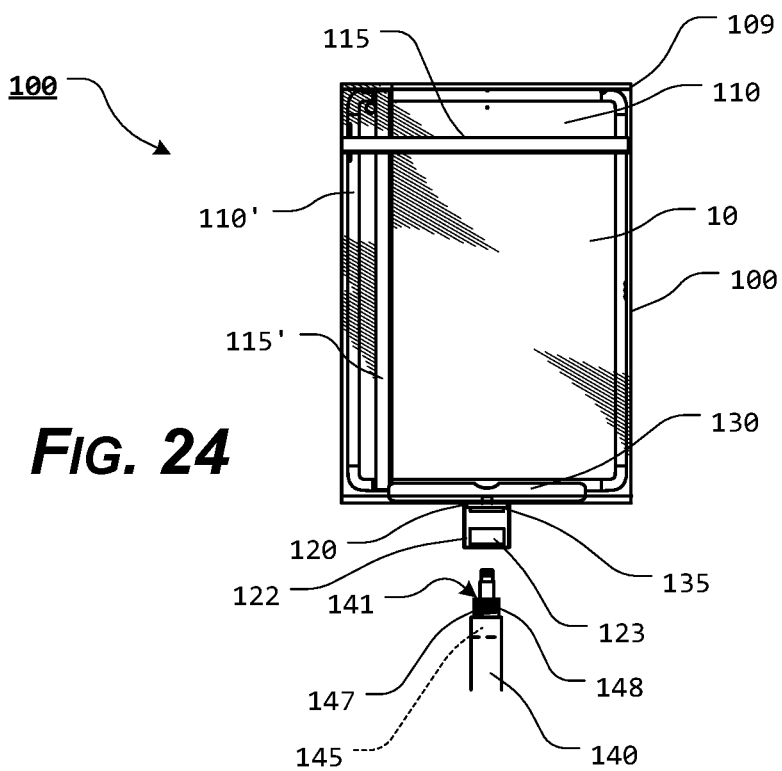
FIG. 24 illustrates a rear view of an exemplary protective sleeve, wherein an exemplary mobile electronic device is positioned within the protective sleeve according to the present disclosure.
Figure 25:
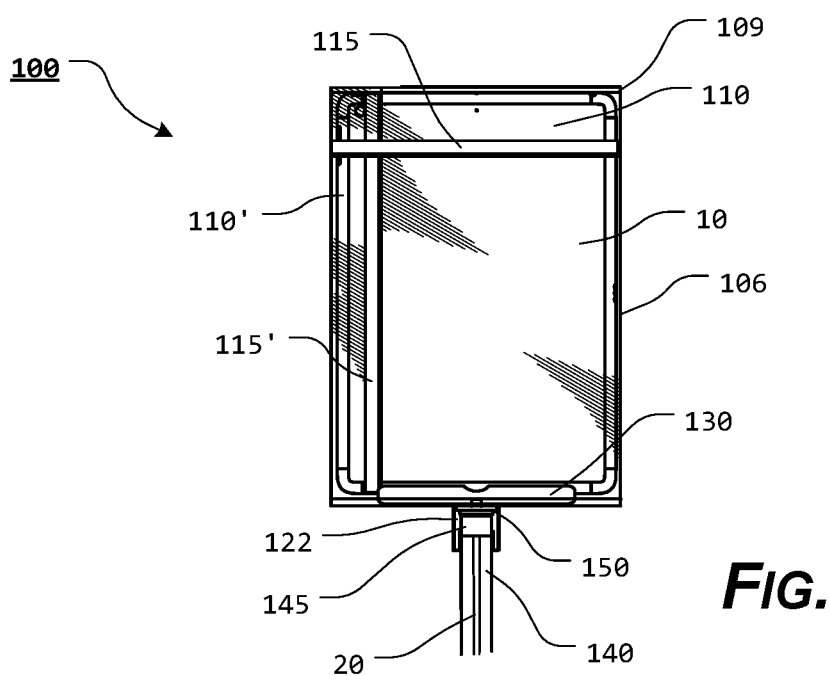
FIG. 25 illustrates a rear view of an exemplary protective sleeve, an exemplary mobile electronic device, an exemplary connector cable, an exemplary interface portion, and an exemplary connector portion, according to the present disclosure.
Figure 26:
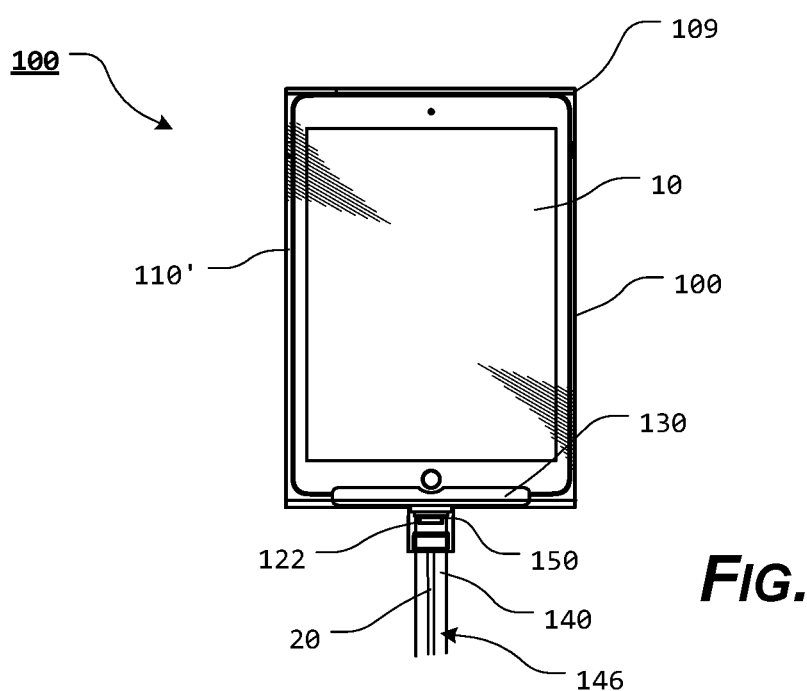
FIG. 26 illustrates a front view of an exemplary protective sleeve, an exemplary mobile electronic device, an exemplary connector cable, an exemplary interface portion, and an exemplary connector portion, according to the present disclosure.

Turning now to the drawing FIGS., FIGS. 1-26 illustrate certain components of an exemplary protective sleeve 100 and/or the cable protector 140, according to the present disclosure.

The protective sleeve 100 and/or the cable protector 140 are shown and described as being used in conjunction with a mobile electronic device 10 and a connector cable 20.

It should be appreciated that the connector cable 20 may be any charging cable or data transfer cable capable of being attached or coupled to the mobile electronic device 10 in order to charge or transfer data to and/or from the mobile electronic device 10. It should also be appreciated that the mobile electronic device 10 includes at least one device connector interface 15, which is capable of allowing a portion of the connector cable 20, such as, for example, the connector element 25, to be attached or coupled at least partially thereto or therein.

A more detailed explanation of the mobile electronic device 10 and connector cable 20, instructions regarding how to attach and/or remove the connector cable 20 to/from the mobile electronic device 10 and other items and/or techniques necessary for the implementation and/or operation of the various components of the mobile electronic device 10 and/or connector cable 20 are not provided herein because such components are commercially available and/or such background information will be known to one of ordinary skill in the art. Therefore, it is believed that the level of description provided herein is sufficient to enable one of ordinary skill in the art to understand and practice the present disclosure, as described.

FIGS. 1-26 illustrate certain elements and/or aspects of various exemplary embodiments of a protective sleeve 100 and/or cable protector 140, according to the present disclosure. As illustrated in FIGS. 1-26, the protective sleeve system of the present disclosure comprises at least some of a protective sleeve 100 and an optional cable protector 140.

In various exemplary, non-limiting embodiments of the presently disclosed systems, methods, and/or apparatuses, the protective sleeve 100 includes a sleeve body 106 defining a sleeve cavity 107 for receiving and holding a mobile electronic device 10. The sleeve body 106 comprises at least one pair of opposed wall portions comprising a front wall portion 101 and a rear wall portion 102 and a pair of opposed wall portions comprising a first side wall portion 103 and a second side wall portion 104. Typically, the front wall portion 101 is considered the front side of the protective sleeve 100 and the mobile electronic device 10 is positioned within the sleeve cavity 107 such that the screen of the mobile electronic device 10 faces the front wall portion 101, while the rear wall portion 102 is considered the rear side of the protective sleeve 100 and the mobile electronic devices 10 positioned within the sleeve cavity 107 such that the screen of the mobile electronic device 10 faces away from the rear wall portion 102.

The protective sleeve 100 includes an exterior surface and an interior surface. The interior surface defines the internal sleeve cavity 107 of the protective sleeve 100.

The first side wall portion 103 and the second side wall portion 104, if included, form additional side wall portions of the protective sleeve 100 that join the front wall portion 101 and the rear wall portion 102 and may be included to add additional shape or depth to the sleeve cavity 107.

However, it should be appreciated that the protective sleeve 100 may optionally be formed such that one or more of the front wall portion 101, the rear wall portion 102, the first side wall portion 103, and/or the second side wall portion 104 is/are sufficient to define the sleeve cavity 107 for receiving the mobile electronic device 10 and the remaining wall portions are not included.

The sleeve cavity 107 extends from an open top portion 109 to a bottom wall portion 104 and may optionally be formed from any number or combination of wall portions, including, for example, a single, continuous wall portion or multiple coupled or joined wall portions. For example, the protective sleeve 100 may optionally be formed of a front wall portion 101 and a rear wall portion 102 heat welded proximate edge portions of the front wall portion 101 and the rear wall portion 102 to define the sleeve cavity 107. Thus, the sleeve cavity 107 may optionally be formed by any cavity, partial cavity, space, or platform that is capable of retaining a mobile electronic device 10.

The open top portion 109 provides access to the sleeve cavity 107.

In certain exemplary, nonlimiting embodiments, the sleeve body 106 merely comprises a single wall portion, such as, for example, the front wall portion 101. Any remaining portions of the protective sleeve 100 may be attached, coupled, or formed as a portion or extension of the front wall portion 101.

A longitudinal axis, AL, extends generally from the open top portion 109 to the bottom wall portion 104 of the protective sleeve 100.

It should be noted that the wall portions of the protective sleeve 100 may generally be planar. Alternatively, the wall portions of the protective sleeve 100 may be contoured or shaped to better accommodate a specific type or model of mobile electronic device 10 to be retained within the protective sleeve 100.

In various exemplary embodiments, the protective sleeve 100 is formed of a Polypropylene or Polyethylene terephthalate (PET) material. In various exemplary embodiments, the wall portions of the protective sleeve 100 are approximately 1.2-1.5 mil thick.

In various exemplary, nonlimiting embodiments, the construction allows the protective sleeve 100 to be thin enough to retain all touch controls of the mobile electronic device 10, while a user is wearing latex or nitrile gloves, while being thick enough to create a safe barrier between the enclosed mobile electronic device 10 and the environment outside the protective sleeve 100.

In various exemplary embodiments, at least certain components of the protective sleeve 100 may optionally be formed of any known or later developed, substantially flexible material(s) such as a polymeric material, or the like, and/or various combinations thereof.

Thus, it should be understood that the material or materials used to form the protective sleeve 100 and/or various components of the protective sleeve 100 is a design choice based on the desired appearance and/or functionality of the protective sleeve 100 and/or various wall portions of the protective sleeve 100.

It should also be understood that the overall size and shape of the protective sleeve 100 and the various portions thereof is a design choice based upon the desired functionality, appearance, or usability of the protective sleeve 100 with a particular mobile electronic device 10.

A top flap 110 extends, generally from a portion of the front wall portion 101, beyond at least a portion of the rear wall portion 102. The top flap 110 is formed so as to be folded over the open top portion 109 to at least partially or fully cover the open top portion 109.

An adhesive strip 115 is provided along a portion of the top flap 110 to allow a portion of the top flap 110 to be permanently or releasably adhesively attached or coupled to a portion of the rear wall portion 102. Prior to use, an adhesive strip cover 117 typically covers the adhesive strip 115.

An aperture or port 120 is formed through the protective sleeve 100, within our proximate the bottom wall portion 104. The port 120 allows access from the exterior of the protective sleeve 100, through the protective sleeve 100, to the sleeve cavity 107. In certain exemplary embodiments, the port 120 is sized so as to provide frictional engagement to portions of a connector cable 20 to be positioned through the port 120. In this manner, when a portion of a connector cable 20 is positioned through the port 120, the edges of the wall portion defining the port 120 form a seal against a portion of the connector cable 20, maintaining a sterile or uncontaminated environment within the sleeve cavity 107.

In various exemplary embodiments, the port 120 is generally placed at or proximate the bottom wall portion 104 of the protective sleeve 100. However, it should be appreciated that the systems and methods of the present disclosure are able to operate regardless of the location of the port 120.

A port tab 122 extends from the front wall portion 101 or the rear wall portion 102, so as to be folded over the port 120 to cover the port 120 at least partially or fully. In various exemplary embodiments, the port tab 122 is an extension of the front wall portion 101 or the rear wall portion 102. Alternatively, the port tab 122 comprises a separate portion of material that is releasably or permanently attached or coupled to the front wall portion 101 or the rear wall portion 102. A port tab adhesive 123 is provided within at least a portion of the port tab 122 to allow a portion of the port tab 122 to be permanently or releasably adhesively attached or coupled to a portion of the rear wall portion 102 or front wall portion 101. Prior to use, a port tab adhesive cover typically covers the port tab adhesive 123.

The port tab 122 may be permanently or releasably attached or coupled to an outer surface of the protective sleeve 100, via a port tab adhesive 123 that serves to both seal the port 120 opening when not used and allow access to the port 120 for connection of the connector cable 20 to a mobile electronic device 10 positioned within a sleeve cavity 107 of the protective sleeve 100.

The cable protector 140 comprises a tubular or flat tubular portion of material having an internal cable protector cavity 146 formed therethrough, along a longitudinal axis or length of the cable protector 140, so as to allow at least a portion of a connector element 25 and at least a portion of a connector cable 20, such as, for example, a charging cord, to pass therethrough.

The cable protector 140 may optionally be formed from any number or combination of wall portions, including, for example, a single, continuous wall portion or multiple coupled or joined wall portions. For example, the cable protector 140 may optionally be formed of a front wall portion and a rear wall portion heat welded proximate edge portions of the front wall portion and the rear wall portion to define the cable protector cavity 146.

In various exemplary embodiments, the cable protector 140 is formed of a Polypropylene or Polyethylene terephthalate (PET) material. In various exemplary embodiments, the wall portions of the cable protector 140 are approximately 1.2-1.5 mil thick.

During use of the protective sleeve 100, a mobile electronic device 10 is inserted through the open top portion 109 and into the sleeve cavity 107. Generally, the mobile electronic device 10 is inserted such that the screen of the mobile electronic device 10 is adjacent the front wall portion 101 of the protective sleeve 100 and the device connector interface 15 of the mobile electronic device 10 is positioned adjacent the port 120.

Once appropriately positioned within the sleeve cavity 107, the adhesive strip cover 117 (if included) is removed from the adhesive strip 115 and the top flap 110 is folded over at least a portion of the rear wall portion 102 and adhesively attached or coupled, via the adhesive strip 115, to the exterior of the rear wall portion 102.

By folding the top flap 110 over at least a portion of the rear wall portion 102, not only is the open top portion 109 at least partially sealed, but the horizontal, or top to bottom length of the protective sleeve 100 may be adjusted to appropriately fit the mobile electronic devices 10.

Once the mobile electronic device 10 is appropriately positioned and at least partially sealed within the protective sleeve 100, the connector cable 20 is urged through an open first end of the cable protector 140, through the internal cavity of the cable protector 140, and at least partially through an open second end 141 of the cable protector 140.

At least a portion of the connector element 25 that extends through the cable protector 140 can then be positioned at least partially through the port 120 to engage the device connector interface 15 of the mobile electronic device 10.

Any port tab adhesive cover (if included) can be removed from the port tab adhesive 123 and the port tab 122 can be folded so as to cover a portion of the port 120 or be adhesively attached or coupled to a portion of the cable protector 140, to further secure the cable protector 140 in a desired position relative to the protective sleeve 100.

In this manner, the mobile electronic device 10 can be utilized in a sterile environment or can be utilized in environment where the mobile electronic device 10 may be subject to contact with certain undesirable substances or materials. Once use of the mobile electronic device 10 within the controlled environment is over, the protective sleeve 100 can be removed from the mobile electronic device 10 and/or the connector cable 20, without needing to be cleaned or re-sterilized.

Accordingly, the user may remove a protective sleeve 100 from the mobile electronic device 10 and easily replace it with another protective sleeve 100, when necessary. Thus, in various exemplary embodiments, the presently disclosed protective sleeve 100 and/or protective sleeve system provides disposable protective sleeves 100 that may be quickly and easily removed and replaced.

Although a durable, reusable protective sleeve 100 may be preferred in many environments, certain situations call for the convenience of a replaceable, disposable protective sleeve 100. For example, in surgical, medical, tattoo studio, food service, mechanical, or other applications a mobile electronic device 10 can quickly be positioned within a protective sleeve 100 and utilized. Once use of the mobile electronic device 10 within the environment is complete, the protective sleeve 100 may be removed and the mobile electronic device 10 can be utilized outside of the aseptic, sterile, or hazardous environment.

In certain exemplary embodiments, as illustrated most clearly in FIGS. 19-26, the protective sleeve 100 includes a separate adhesive strip 115' formed along a portion of the separate adhesive strip 115' is formed along a portion of the rear wall portion 102 of the protective sleeve 100, proximate the first side wall portion 103 or the second side wall portion 104. Prior to use, an adhesive strip cover 117' typically covers the adhesive strip 115'.

If included, the separate adhesive strip 115' allows a portion of a side of the protective sleeve 100 to be folded toward the rear wall portion 102, generally substantially parallel to the longitudinal axis, AL, of the protective sleeve 100, to form a side flap 110'. The separate adhesive strip 115' then allows a portion of the side flap 110' to be adhesively attached or coupled to a portion of the rear wall portion 102. In this manner, the horizontal, or side to side width of the protective sleeve 100 may be adjusted to appropriately fit the inserted mobile electronic devices 10.

In certain exemplary embodiments, as illustrated most clearly in FIGS. 1-3 and 20-26, the protective sleeve system of the present disclosure includes an interlocking system 150 or a quick disconnect that further facilitates use of a connector cable 20 with the protective sleeve 100 and the mobile electronic device 10.

The interlocking system 150 allows the connector cable 20 to pass through and remain uncontaminated while being used. The interlocking system 150 is optionally integrated into a portion of the protective sleeve 100 for strength and safety. The interlocking system 150 provides a unique feature to the protective sleeve 100 in that the protective sleeve 100 allows a mobile electronic device 10 positioned within the sleeve cavity 107 to be attached or coupled to the connector cable 20 during use without the fear of cross-contamination. Both protective sleeves 100 and integrated cable extension protector (interlocking system 150) may vary in sizes to fit various applications to ensure safety and cleanliness.

The interlocking system 150, if included, comprises at least some of an interface portion 135 and a connector portion 148. The interface portion 135 extends from the sleeve cavity 107, through the port 120, to the exterior of the protective sleeve 100. In various exemplary embodiments, the interface portion 135 is attached, coupled, or sealed within the port 120.

In various exemplary embodiments, an interface flange 130 extends from the interface portion 135 so as to be positioned within the sleeve cavity 107. The interface flange 130 extends from the interface portion 135 so as not to be urged through the port 120. In this manner, the interface flange 130 acts to anchor the interface portion 135 proximate the bottom wall portion 104 of the sleeve cavity 107.

In certain exemplary embodiments, a portion of the interface flange 130 is formed so as to cradle at least a portion of the mobile electronic device 10, within the sleeve cavity 107.

The connector portion 148 is attached or coupled to the open second end 141 of the cable protector 140 and is formed so as to interact with the interface portion 135. In various exemplary embodiments, a connector flange 145 extends from the connector portion 148, which may be heat welded, adhesively bonded, or otherwise attached or coupled to the open second end 141 of the cable protector 140. Thus, the interface portion 135 is attached or coupled to the protective sleeve 100, while the connector portion 148 is attached or coupled to the cable protector 140.

In various exemplary embodiments, the interface portion 135 includes internal threads 137, while the connector portion 148 includes external threads 147, mateable to the internal threads 137 of the interface portion 135. The internal threads 137 of the interface portion 135 includes threads that correspond to the external threads 147 of the connector portion 148. Thus, the connector portion 148 may be threadedly attached to the interface portion 135, via interaction of the external threads 147 of the connector portion 148 and the internal threads 137 of the interface portion 135. When the connector portion 148 is threadably attached to the interface portion 135, the sleeve cavity 107 is in communicating relationship with the internal cavity of the cable protector 140, such that the connector cable 20 may interact with the mobile electronic device 10 positioned within the sleeve cavity 107.

It should be appreciated that while the interface portion 135 is described as including internal threads 137 in the connector portion 148 is described as having external threads 147, this is merely exemplary and not limiting. Thus, the interface portion 135 may include external threads, while the connector portion 148 includes internal threads. Alternatively, the interlocking system 150 may comprise other quick disconnect features such as spring-loaded twist locking or other known or later developed corresponding releasable attachment and detachment elements.

While the present disclosure has been described in conjunction with the exemplary embodiments outlined above, the foregoing description of exemplary embodiments, as set forth above, are intended to be illustrative, not limiting and the disclosure should not be considered to be necessarily so constrained. It is evident that the present disclosure is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the present disclosure. The upper and lower limits of these smaller ranges may independently be included in the smaller ranges and is also encompassed within the present disclosure, subject to any specifically excluded limit in the stated range. Where the stated range includes one or both of the limits, ranges excluding either or both of those included limits are also included in the present disclosure.

It is to be understood that the phraseology of terminology employed herein is for the purpose of description and not of limitation. Unless defined otherwise, all technical and scientific terms used herein have the same meaning as commonly understood by one of ordinary skill in the art to which the present disclosure belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the present disclosure, such that others may, by applying current knowledge, change, vary, modify, and/or adapt these exemplary, non-limiting embodiments for various applications without departing from the spirit and scope of the present disclosure and elements or methods similar or equivalent to those described herein can be used in practicing the present disclosure. Any and all such changes, variations, modifications, and/or adaptations should and are intended to be comprehended within the meaning and range of equivalents of the disclosed exemplary embodiments and may be substituted without departing from the true spirit and scope of the present disclosure.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A protective sleeve, comprising:
   a protective sleeve body having at least one pair of opposed wall portions comprising a front wall portion and a rear wall portion, wherein an internal sleeve cavity is formed within at least a portion of said protective sleeve body, wherein said sleeve cavity is defined between an open top portion of said sleeve body and a bottom wall portion of said sleeve body;
   a top flap extending from a portion of said front wall portion, beyond at least a portion of said rear wall portion, wherein said top flap is foldable over said open top portion to at least partially cover said open top portion;
   an adhesive strip provided along a portion of said top flap to allow a portion of said top flap to be permanently or releasably adhesively attached or coupled to a portion of an exterior surface of said rear wall portion of said protective sleeve;
   a separate adhesive strip formed along at least a portion of said exterior surface of said rear wall portion, to allow a first portion of said exterior surface of said rear wall portion to be permanently or releasably adhesively attached or coupled to a second portion of said exterior surface of said rear wall portion to adjust a width of said protective sleeve and a size of said sleeve cavity;
   a port formed through said protective sleeve, proximate said bottom wall portion, wherein said port allows access from an exterior of said protective sleeve, through said protective sleeve, to said sleeve cavity;
   a port tab extending from said front wall portion, wherein said port tab is foldable over said port to at least partially cover said port; and
   a cable protector having an internal cavity formed therethrough, along a length of said cable protector, wherein at least a portion of said port tab can be adhesively attached or coupled to a portion of said cable protector to permanently or releasably adhesively attach or couple said portion of said cable protector to said protective sleeve.

2. The protective sleeve of claim 1, further comprising a pair of opposed wall portions comprising a first side wall portion and a second side wall portion, wherein said first side wall portion and said second side wall portion join said front wall portion and said rear wall portion.

3. The protective sleeve of claim 1, wherein at least a portion of said front wall portion is heat welded or adhesively bonded to at least a portion of said rear wall portion, proximate edge portions of said front wall portion and said rear wall portion, to define said sleeve cavity.

4. The protective sleeve of claim 1, wherein said protective sleeve is formed of Polyethylene terephthalate.

5. The protective sleeve of claim 1, wherein said wall portions of said protective sleeve are approximately 1.2-1.5 mil thick.

6. The protective sleeve of claim 1, wherein said adhesive strip is provided to allow a portion of said top flap to be permanently or releasably adhesively attached or coupled to a portion of an exterior surface of said protective sleeve.

7. The protective sleeve of claim 1, wherein said adhesive strip is provided along a portion of said top flap substantially perpendicular to a longitudinal axis of said protective sleeve and wherein said separate adhesive strip is provided substantially parallel to said longitudinal axis of said protective sleeve.

8. The protective sleeve of claim 1, further comprising an interface portion extending from said sleeve cavity, through said port, to said exterior of said protective sleeve and a connector portion attached or coupled to an open end of said cable protector.

9. A protective sleeve, comprising:
   a protective sleeve body having at least one pair of opposed wall portions comprising a front wall portion and a rear wall portion, wherein an internal sleeve cavity is formed within at least a portion of said protective sleeve body, wherein said sleeve cavity is defined between an open top portion of said sleeve body and a bottom wall portion of said sleeve body;
   a top flap extending from a portion of said front wall portion, beyond at least a portion of said rear wall portion, wherein said top flap is foldable over said open top portion to at least partially cover said open top portion;
   an adhesive strip provided along a portion of said top flap to allow a portion of said top flap to be permanently or releasably adhesively attached or coupled to a portion of an exterior surface said rear wall portion of said protective sleeve;
   a separate adhesive strip formed along at least a portion of said exterior surface of said rear wall portion of said protective sleeve to allow a first portion of said exterior surface of said rear wall portion to be permanently or releasably adhesively attached or coupled to a second portion of said exterior surface of said rear wall portion, wherein if said first portion of said exterior surface of said exterior surface of said rear wall portion is permanently or releasably adhesively attached or coupled to said second portion of said exterior surface of said rear wall portion, said width of said protective sleeve is adjusted;

a port formed through said protective sleeve, proximate said bottom wall portion, wherein said port allows access from an exterior of said protective sleeve, through said protective sleeve, to said sleeve cavity; and a port tab extending from said front wall portion, wherein said port tab is foldable over said port to at least partially cover said port.

10. The protective sleeve of claim 9, wherein said protective sleeve is formed of Polypropylene or Polyethylene terephthalate.

11. The protective sleeve of claim 9, wherein said wall portions of said protective sleeve are approximately 1.2-1.5 mil thick.

12. The protective sleeve of claim 9, further comprising a pair of opposed wall portions comprising a first side wall portion and a second side wall portion, wherein said first side wall portion and said second side wall portion join said front wall portion and said rear wall portion.

13. The protective sleeve of claim 9, wherein at least a portion of said front wall portion is heat welded or adhesively bonded to at least a portion of said rear wall portion, proximate edge portions of said front wall portion and said rear wall portion, to define said sleeve cavity.

14. The protective sleeve of claim 9, further comprising a cable protector comprising a tubular or flat tubular portion of material having an internal cavity formed therethrough.

15. The protective sleeve of claim 14, further comprising an interface portion extending from said sleeve cavity, through said port, to said exterior of said protective sleeve and a connector portion attached or coupled to an open end of said cable protector.

16. A protective sleeve, comprising:

a protective sleeve body having an internal sleeve cavity formed within at least a portion of said protective sleeve body, wherein said sleeve cavity is defined between an open top portion of said sleeve body and a bottom wall portion of said sleeve body;

a top flap extending from a portion of a front wall portion of said protective sleeve body, wherein said top flap is foldable over said open top portion to at least partially cover said open top portion;

an adhesive strip provided along a portion of said top flap to allow a portion of said top flap to be permanently or releasably adhesively attached or coupled to a portion of an exterior surface of a rear wall portion of said protective sleeve;

a separate adhesive strip formed along at least a portion of said exterior surface of said rear wall portion of said protective sleeve to allow a first portion of said exterior surface of said rear wall portion to be permanently or releasably adhesively attached or coupled to a second portion of said exterior surface of said rear wall portion to adjust a width of said protective sleeve and a size of said sleeve cavity;

a port formed through said protective sleeve, proximate said bottom wall portion, wherein said port allows access from an exterior of said protective sleeve, through said protective sleeve, to said sleeve cavity; and a port tab extending from said protective sleeve body, wherein said port tab is foldable over said port to at least partially cover said port.

17. The protective sleeve of claim 16, wherein said protective sleeve is formed of Polypropylene or Polyethylene terephthalate.

18. The protective sleeve of claim 16, further comprising a pair of opposed wall portions comprising a first side wall portion and a second side wall portion, wherein said first side wall portion and said second side wall portion join said front wall portion and said rear wall portion.

19. The protective sleeve of claim 16, wherein at least a portion of said front wall portion is heat welded or adhesively bonded to at least a portion of said rear wall portion, proximate edge portions of said front wall portion and said rear wall portion, to define said sleeve cavity.

20. The protective sleeve of claim 16, further comprising a cable protector comprising a portion of material having an internal cavity formed therethrough, an interface portion extending from said sleeve cavity, through said port, to said exterior of said protective sleeve, and a connector portion attached or coupled to an open end of said cable protector.

* * * * *